(12) United States Patent
Jacobsen et al.

(10) Patent No.: US 9,599,769 B2
(45) Date of Patent: Mar. 21, 2017

(54) HYDROGEN-RESISTANT OPTICAL FIBER

(71) Applicant: Verrillon, Inc., North Grafton, MA (US)

(72) Inventors: William Jacobsen, Bolton, CT (US); Abdelouahed Soufiane, Natick, MA (US)

(73) Assignee: VERRILLON, INC., North Grafton, MA (US)

( * ) Notice: Subject to any disclaimer, the term of this patent is extended or adjusted under 35 U.S.C. 154(b) by 0 days.

(21) Appl. No.: 14/932,521

(22) Filed: Nov. 4, 2015

(65) Prior Publication Data

US 2016/0124143 A1    May 5, 2016

Related U.S. Application Data

(60) Provisional application No. 62/074,897, filed on Nov. 4, 2014.

(51) Int. Cl.
| | |
|---|---|
| *G02B 6/02* | (2006.01) |
| *G02B 6/028* | (2006.01) |
| *G02B 6/036* | (2006.01) |
| *C03C 3/06* | (2006.01) |
| *C03C 13/04* | (2006.01) |
| *C03C 25/10* | (2006.01) |
| *C03B 37/018* | (2006.01) |

(52) U.S. Cl.
CPC ............. *G02B 6/0281* (2013.01); *C03C 3/06* (2013.01); *C03C 13/045* (2013.01); *C03C 25/104* (2013.01); *G02B 6/02* (2013.01); *G02B 6/0283* (2013.01); *G02B 6/03627* (2013.01); *C03B 37/018* (2013.01); *C03B 2201/12* (2013.01); *C03B 2201/31* (2013.01); *C03B 2201/42* (2013.01); *C03B 2201/70* (2013.01); *C03B 2203/23* (2013.01); *C03B 2203/26* (2013.01); *C03C 2201/02* (2013.01); *C03C 2201/12* (2013.01); *C03C 2201/31* (2013.01); *C03C 2217/91* (2013.01)

(58) Field of Classification Search
None
See application file for complete search history.

(56) References Cited

U.S. PATENT DOCUMENTS

| | | | |
|---|---|---|---|
| 6,321,007 B1 | 11/2001 | Sanders | |
| 6,853,798 B1 | 2/2005 | Weiss | |
| 8,369,672 B2 | 2/2013 | Jacobsen et al. | |
| 8,542,967 B2 * | 9/2013 | Gooijer | G02B 6/0281 385/124 |
| 8,879,878 B2 * | 11/2014 | Bigot-Astruc | G02B 6/0288 385/126 |
| 9,405,062 B2 * | 8/2016 | Krabshuis | G02B 6/0288 |
| 2001/0036349 A1 * | 11/2001 | Abe | C03B 37/01446 385/124 |
| 2010/0254653 A1 | 10/2010 | Molin et al. | |
| 2012/0039361 A1 * | 2/2012 | Gooijer | G02B 6/0281 374/161 |
| 2012/0275751 A1 * | 11/2012 | Krabshuis | G02B 6/0281 385/126 |
| 2014/0241684 A1 | 8/2014 | Bookbinder et al. | |
| 2016/0124143 A1 * | 5/2016 | Jacobsen | G02B 6/0281 385/124 |

FOREIGN PATENT DOCUMENTS

EP    2 518 546 A1    10/2012

OTHER PUBLICATIONS

International Search Report and Written Opinion in PCT/US2015/059035 dated Feb. 5, 2016, 10 pages.

* cited by examiner

*Primary Examiner* — Rhonda Peace

(74) *Attorney, Agent, or Firm* — Goodwin Procter LLP

(57) ABSTRACT

Embodiments of the invention relate to a hydrogen-resistant optical fiber with a core having a central axis. The core may include only silica, or only silica and fluorine, while a cladding region surrounding the core may be made of silica and fluorine, along with at least one of germanium, phosphorus, and titanium.

22 Claims, 7 Drawing Sheets

HYDROGEN-RESISTANT OPTICAL FIBER

CROSS REFERENCE TO RELATED APPLICATION

This application claims priority to and the benefit of, and incorporates herein by reference in its entirety, U.S. Ser. Provisional Patent Application No. 62/074,897, which was filed on Nov. 4, 2014.

TECHNICAL FIELD

In various embodiments, the invention relates to optical fibers, and more particularly to hydrogen-resistant optical fibers with a core free from materials such as germanium, phosphorus, and titanium. The hydrogen-resistant optical fibers may be adapted for use in hydrogen-rich environments, e.g., downhole in a wellbore, to communicate with equipment or to function as a sensor.

BACKGROUND

Certain optical fibers have been developed having a core made of only pure silica and fluorine, such as those fibers described in U.S. Pat. No. 6,853,798, incorporated herein by reference in its entirety. The cores may be produced by chemical vapor deposition. Fibers with a silica core, doped predominantly with fluorine, can allow hydrogen to enter the core freely. This behavior is illustrated by, for example, the induced loss at 1380 nm ("water peak") depicted in FIG. 1, which is understood to be due to a reaction between $H_2$ and silica defects to create OH-ions, resulting in a permanent loss. In contrast, much of the loss at 1241 nm ("hydrogen peak") is transient, and is understood to be due to unreacted $H_2$.

Various techniques have been used to address the issue of high losses, e.g., at 1380 nm and 1241 nm. For example, U.S. Pat. No. 8,542,967, incorporated herein by reference in its entirety, teaches introducing 0.1 wt % to 5 wt % germanium to its core, as the integration of germanium into the silica and fluorine matrix may prevent hydrogen from completely flooding the core. FIG. 2 contrasts the induced loss of an optical fiber with 0% germanium in the core with one containing 3 mol % germanium in the core. At 1380 nm and at 1241 nm, the induced loss of the germanium doped fiber is lower than that of the 0% germanium doped fiber.

However, while the presence of germanium in the core may mitigate some of the losses at 1380 nm and at 1241 nm, the presence of germanium can create new problems. U.S. Pat. No. 6,853,798 specifically identifies that the presence of germanium promotes the formation of OH bonds in a downhole environment. Further, germanium-induced defects, combined with the presence of hydrogen, can cause different peaks to form. These peaks, which tend to form at wavelengths less than 800 nm, often increase over time, with peaks becoming large enough to negatively impact wavelengths used by typical downhole geophysical and geothermal well sensors.

A need exists, therefore, to address issues associated with hydrogen getting into a core of pure silica and/or fluorine, without relying on the use of materials such as germanium, phosphorus, and titanium in the core that can introduce additional undesirable features.

SUMMARY OF THE INVENTION

Embodiments of the invention relate to optical fibers with cores of pure silica that may be doped with fluorine. While these fibers can appear to be susceptible to hydrogen flooding the core, an inner cladding region having another material, such as germanium, phosphorus, and/or titanium, may help prevent the core from exposure to hydrogen. By relying on the inner cladding region to prevent hydrogen access to the core, the optical fiber of the invention can exhibit the beneficial properties of a pure silica core while decreasing hydrogen related losses (e.g., those experienced at 1241 nm and 1380 nm), allowing such an optical fiber to provide greater stability over the long term in a hydrogen-rich environment, such as downhole applications, including at wavelengths often associated with sensors in the spectral range between 800 nm and 1600 nm.

In an aspect, embodiments of the invention include a hydrogen-resistant, graded-index optical fiber including a core having a central axis, and including or consisting essentially of silica and fluorine. A concentration of fluorine within the core increases as a radial distance from the central axis increases. A cladding region surrounding the core, the cladding region including silica, fluorine, and at least one of germanium, phosphorus, and titanium.

One or more of the following features may be included. The cladding region may include an inner cladding region that includes silica, fluorine, and at least one of germanium, phosphorus, and titanium, with a refractive index of the inner cladding region being lower than a refractive index of the core.

A concentration of fluorine and at least one of germanium, phosphorus, and titanium in the inner cladding region may vary substantially across the inner cladding region, or is substantially constant across the inner cladding region. The inner cladding region may include about 0.1 wt % to about 5.0 wt % of at least one of germanium, phosphorus, and titanium.

The inner cladding region may include at least one trench characterized by a lower refractive index than adjacent areas. Each trench may have at least one of (i) a width of about 2% to about 33% of a radius of the core, (ii) a decrease in refractive index relative to other areas of the inner cladding region of about $-5 \times 10^{-3}$ to about $-1 \times 10^{-3}$, and (iii) a location adjacent the core. Each trench may consist essentially of silica and fluorine. Alternatively, each trench may consist essentially of silica, fluorine, and about 0.1 wt % to about 5.0 wt % of at least one of germanium, phosphorus, and titanium. A concentration of fluorine and at least one of germanium, phosphorus, and titanium in each trench may vary substantially across the respective trench, or may remain substantially constant across the respective trench.

The cladding region may include an outer cladding region that includes silica, fluorine, and at least one of germanium, phosphorus, and titanium. A concentration of fluorine and at least one of germanium, phosphorus, and titanium in the outer cladding region may vary substantially across the outer cladding region. A concentration of fluorine and at least one of germanium, phosphorus, and titanium in the outer cladding region may remain substantially constant across the outer cladding region. The outer cladding region may include about 0.1 wt % to about 5.0 wt % of at least one of germanium, phosphorus, and titanium.

The cladding may further include an inner cladding region disposed between the core and the outer cladding region, the inner cladding region (i) including silica, fluorine, and at least one of germanium, phosphorus, and titanium, and (ii) the inner cladding region having a refractive index lower than a refractive index of the core. Alternatively, the cladding may further comprise an inner cladding region disposed between the core and the outer cladding region, and the inner cladding region consists essentially of silica and fluorine.

In another aspect, embodiments of the invention relate to a hydrogen-resistant, graded-index optical fiber including a core having a central axis, the core including or consisting essentially of silica and fluorine, with a concentration of fluorine within the core increasing as a radial distance from the central axis increases. An inner cladding region may surround the core, the inner cladding region including at least one trench having a lower refractive index than refractive indices of areas adjacent thereto.

In yet another aspect, embodiments of the invention include a hydrogen-resistant, step-index optical fiber including a core having a central axis and having a uniform composition, including silica. A cladding region surrounds the core, and includes silica, fluorine, and at least one of germanium, phosphorus, and titanium.

One or more of the following features may be included. The cladding region may include an inner cladding region that (i) contains silica, fluorine, and at least one of germanium, phosphorus, and titanium, and (ii) has a refractive index lower than a refractive index of the core.

A concentration of fluorine and at least one of germanium, phosphorus, and titanium in the inner cladding region may vary substantially across the inner cladding region. Alternatively, a concentration of fluorine and at least one of germanium, phosphorus, and titanium in the inner cladding region may be substantially constant.

The inner cladding region may include about 0.1 wt % to about 5.0 wt % of at least one of germanium, phosphorus, and titanium.

The inner cladding region may include at least one trench characterized by a lower refractive index than adjacent areas. Each trench may have at least one of a width of about 2% to about 33% of a radius of the core, a decrease in refractive index relative to other areas of the inner cladding region of about $-5 \times 10^{-3}$ to about $-1 \times 10^{-3}$, and a location adjacent the core.

Each trench may include or consist essentially of silica and fluorine. Alternatively, each trench may include or consist essentially of silica, fluorine, and about 0.1 wt % to about 5.0 wt % of at least one of germanium, phosphorus, and titanium. A concentration of fluorine and at least one of germanium, phosphorus, and titanium in each trench may vary substantially across the trench, or may be substantially constant.

The cladding region may include an outer cladding region, the outer cladding region including silica, fluorine, and at least one of germanium, phosphorus, and titanium.

A concentration of fluorine and at least one of germanium, phosphorus, and titanium in the outer cladding region may vary substantially across the outer cladding region, or be substantially constant across the outer cladding region.

The outer cladding region may include about 0.1 wt % to about 5.0 wt % of at least one of germanium, phosphorus, and titanium.

The cladding region may further include an inner cladding region disposed between the core and the outer cladding region, the inner cladding region (i) including or consisting essentially of silica, fluorine, and at least one of germanium, phosphorus, and titanium, and (ii) having a refractive index lower than a refractive index of the core.

The cladding region may include an inner cladding region disposed between the core and the outer cladding region, and the inner cladding region may include or consist essentially of silica and fluorine.

The core may include or consist essentially of silica, or silica and fluorine.

These and other objects, along with advantages and features of embodiments of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

In general, embodiments of the present invention relate to a hydrogen-resistant optical fiber having a pure silica core that may or may not be doped with fluorine. A cladding region surrounding the core may be doped with materials in addition to fluorine, such as germanium, phosphorus, and/or titanium, to help protect the core from hydrogen infiltration. An inner cladding region and/or an outer cladding region of the cladding region may include these dopants. An optical fiber of such construction may be suitable for use in hydrogen-rich environments without suffering from the problems associated with pure silica and fluorine optical fibers (e.g., induced loss peaks at 1380 nm and 1241 nm) or the problems associated with the use of germanium and similar materials (e.g., peaks formed at different wavelengths that increase with time), allowing for consistent long-term usage in a variety of applications, including for use with downhole sensors.

As used herein, a step-index optical fiber is an optical fiber having a refractive index profile with a uniform refractive index profile within the core and a sharp decrease in refractive index at the core-cladding interface so that the cladding has a lower refractive index than the core.

As used herein, a graded-index optical fiber is an optical fiber having a refractive index that decreases with increasing radial distance from the optical axis of the fiber.

Figure 1:
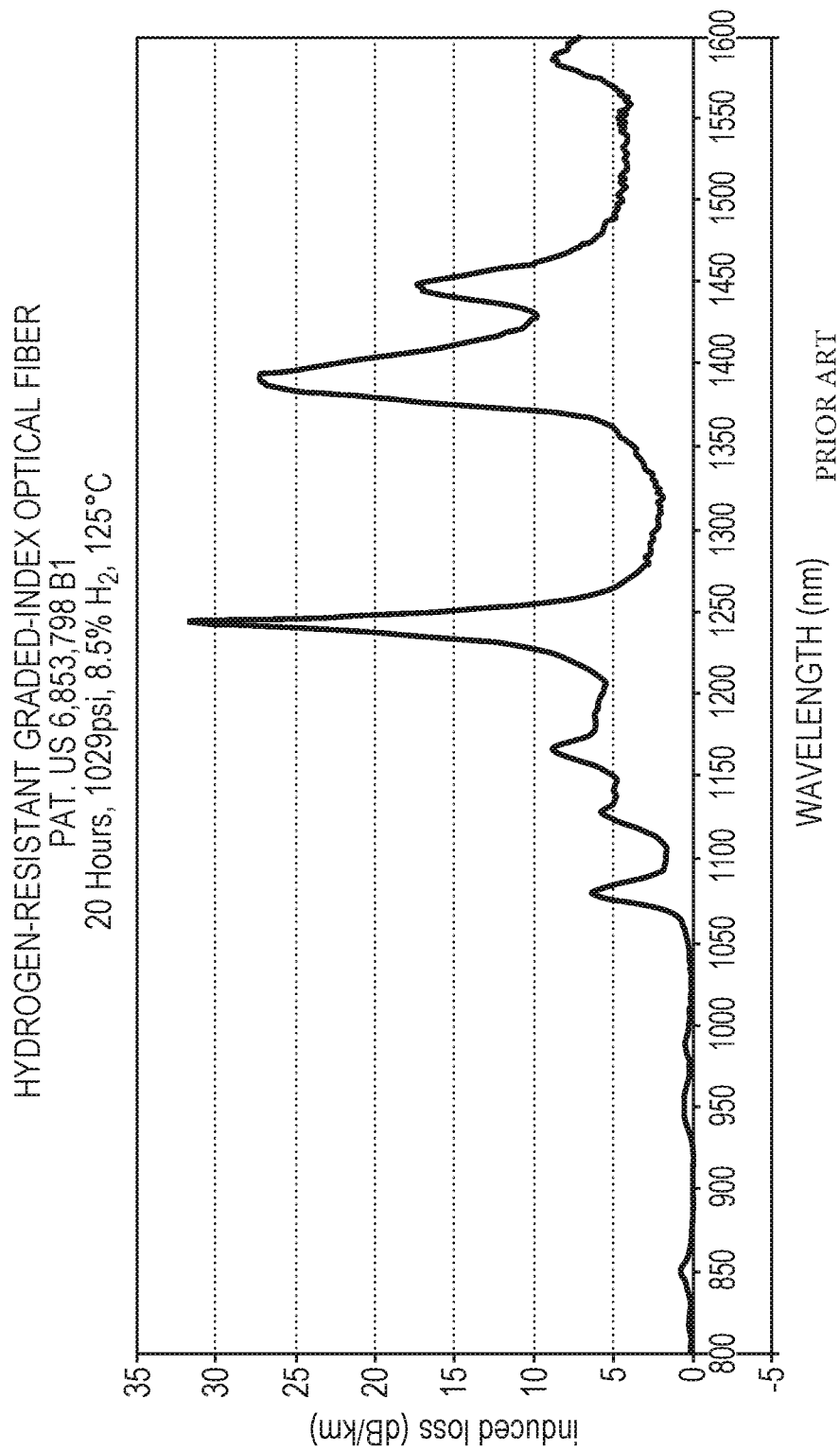
FIG. 1 is a graph of induced losses at various wavelengths of an optical fiber with a pure silica core doped solely with fluorine, for a prior art optical fiber.
Figure 2:
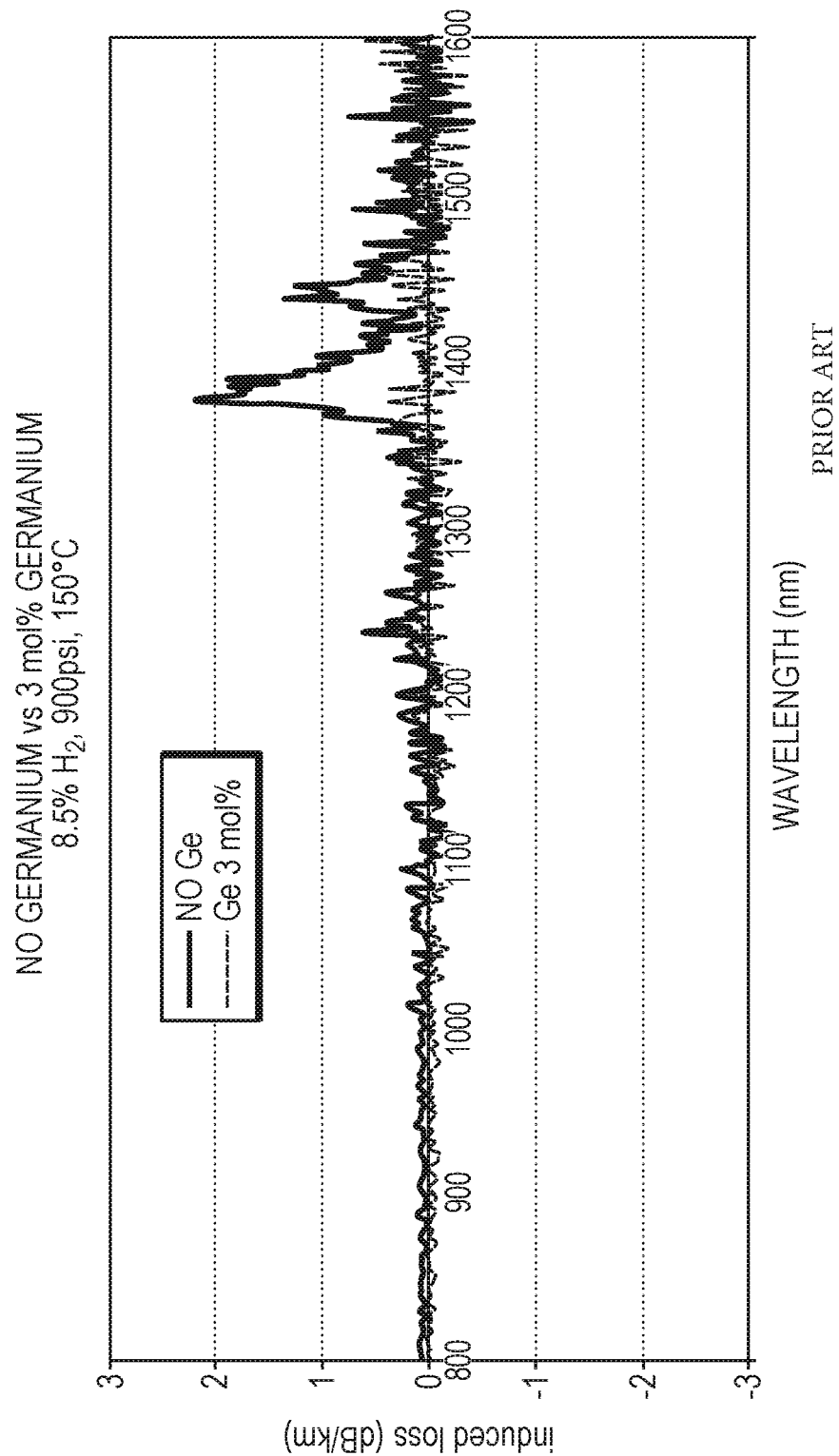
FIG. 2 is a graph of induced losses at various wavelengths of an optical fiber having a core without germanium and an optical fiber having a core with germanium, for a prior art optical fiber.
Figure 3:
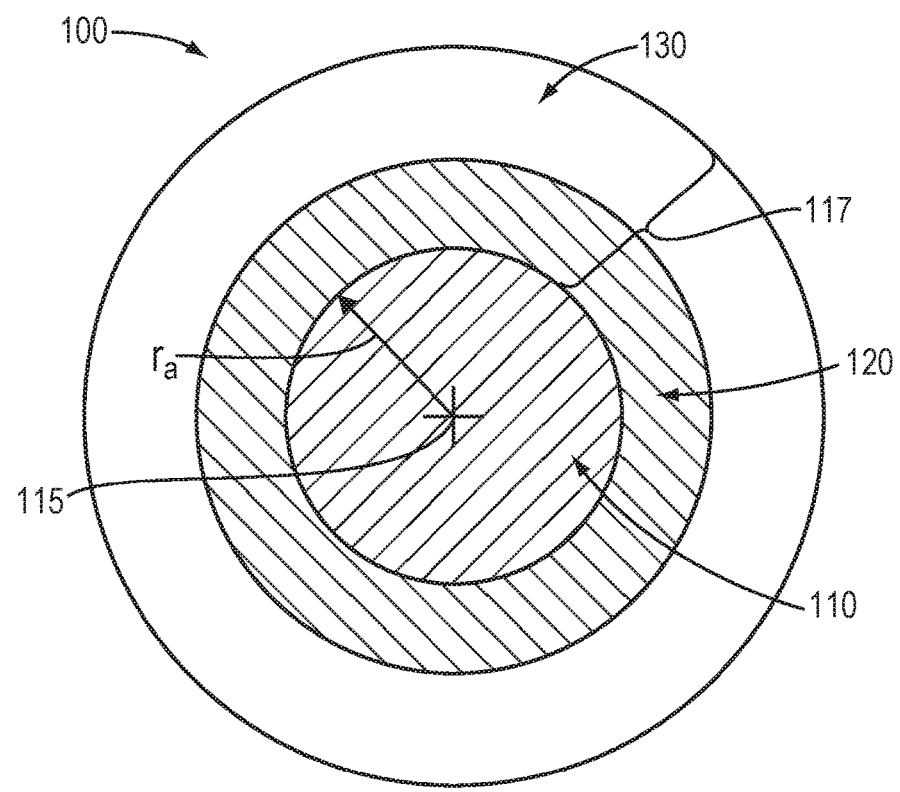
FIG. 3 is a schematic cross-section of an optical fiber, in accordance with one embodiment of the invention.

An exemplary fiber 100, in accordance with one embodiment of the invention, is shown in FIG. 3. The fiber 100 includes a core 110 having a central axis 115. The core 110 may be essentially round with an outer radius $r_a$. The outer radius $r_a$ may be selected from a range of, e.g., 32.5 μm to 18.75 μm. More preferably, the outer radius $r_a$ may range from, e.g., 26.5 μm to 23.5 μm.

Figure 4:
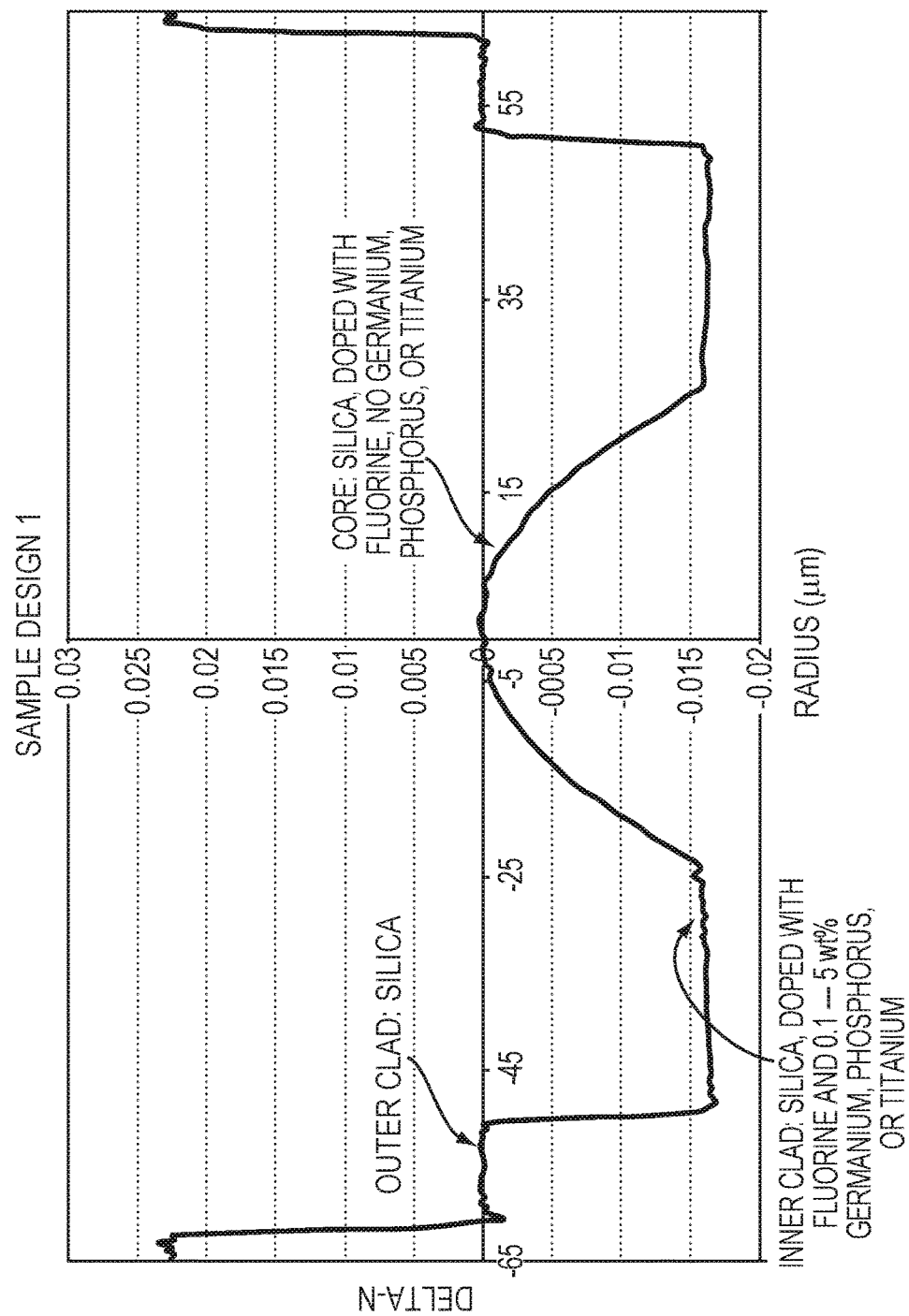
FIG. 4 is a graph of the refractive index profile across different regions of a graded-index optical fiber, in accordance with one embodiment of the invention.

The core 110 may be formed, for example, from pure silica. Such a core 110 can be used as part of a step-index optical fiber 100, and can provide improved hydrogen resistance due to an overall decrease in defects, since there are no dopants in the core. The core 110 can be doped with fluorine, which tends to lower a refractive index of the core 110. Concentrations of fluorine may vary across the fiber 100, for example, starting with a minimal amount at the central axis 115 and increasing as the radial distance from the central axis 115 increases. This can result in a parabolic curve when plotting a refractive index against the radial distance from the central axis 115, as depicted in FIG. 4, which is described in more detail below. This is considered a graded-index optical fiber.

A cladding region 117 surrounds the core. The cladding region 117 includes at least one of an inner cladding region 120 that may directly surround the core 110, and an outer cladding region 130 that may surround the inner cladding region 120. The outer cladding region 130 can be composed of a variety of materials, including silica-based glass compositions. The outer cladding region 130 can further be doped with a material to help protect the inner cladding 120 and the core 110 from contacting hydrogen in the environment, such as germanium, phosphorus, and/or titanium. Concentrations of fluorine, germanium, phosphorus, and/or titanium can vary or be constant across the outer cladding region 130, if they are present. If germanium, phosphorus, and/or titanium are present in the outer cladding region 130, the concentration can vary between, e.g., 0.1 wt % to 5.0 wt %. In an embodiment, the outermost part of the outer cladding region 130 is pure silica, while the innermost part of the outer cladding region 130 contains fluorine, germanium, phosphorus, and/or titanium.

The inner cladding region 120 preferably has a lower refractive index than the core 110. The inner cladding region 120 can include a wide variety of materials, including silica (which is present throughout the optical fiber 100) and fluorine (which can be used to selectively dope the silica in desired locations).

The inner cladding region 120 can further be doped with a material to help protect the core 110 from contacting hydrogen in the environment, such as germanium, phosphorus, and/or titanium. Germanium, phosphorus, and titanium can help protect the core from hydrogen, even in relatively small amounts (e.g., about 0.1 wt % to about 5.0 wt % of the inner cladding region 120). Surprisingly, although it is preferable to not include germanium, phosphorus, and titanium in the core, to reduce long-term losses at wavelengths typically used by sensors, the inclusion of these elements in the inner cladding region 120 and/or outer cladding region 130 can prevent the introduction of hydrogen into the core and reduce long-term losses at all (or virtually all) common wavelengths. The inclusion of germanium, phosphorus, and/or titanium in the inner cladding 120/outer cladding 130 can create bonds with hydrogen as it diffuses into the glass, preventing hydrogen from entering the core.

Concentrations of fluorine, along with germanium, phosphorus, and/or titanium, can remain substantially constant across the inner cladding region 120. However, in some embodiments, concentrations of fluorine, along with germanium, phosphorus, and/or titanium, can vary substantially across the inner cladding region 120. For example, particular portions (e.g., trench area 140 in FIG. 5) of the inner cladding region 120 may have a particularly high concentration of fluorine, which greatly lowers the refractive index in that area, particularly if the concentration of germanium, phosphorus, and/or titanium in the same area is low or negligible. This decrease in the refractive index relative to adjacent areas defines the trench 140 in the inner cladding region 120, as depicted in the refractive index profile in FIG. 6. The decrease in the refractive index of the trench may be between about $-5 \times 10^{-3}$ and $-1 \times 10^{-3}$ relative to other areas of the inner cladding region 120, although deeper and shallower trenches 140 may be created.

Figure 5:
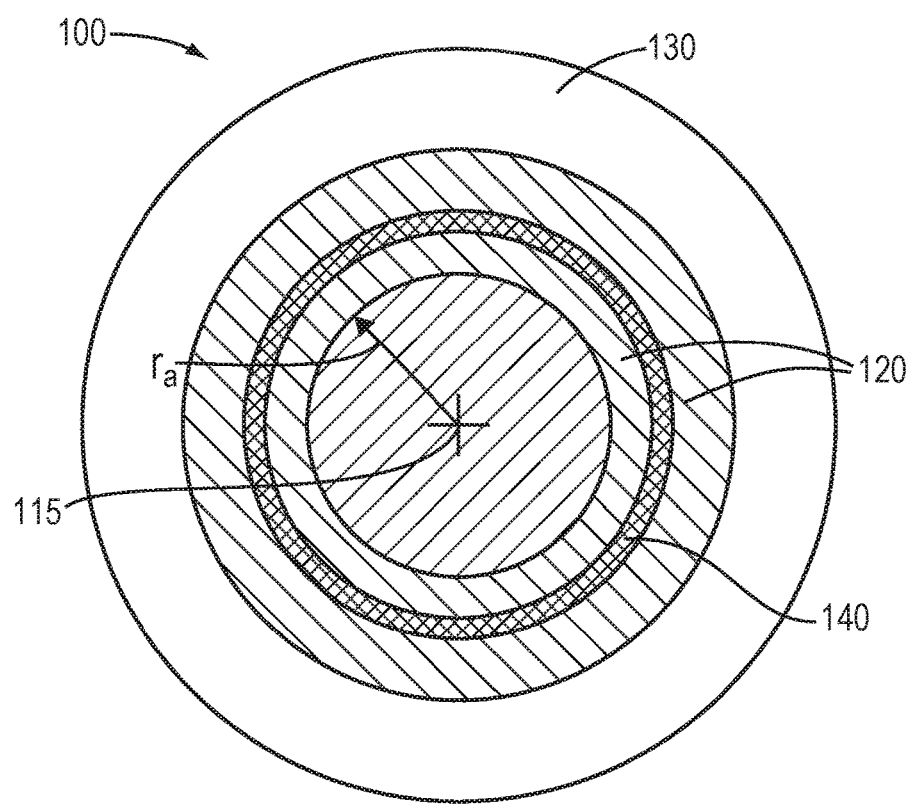
FIG. 5 is a schematic cross-section of an optical fiber, including a trench in an inner cladding region, in accordance with one embodiment of the invention.
Figure 6:
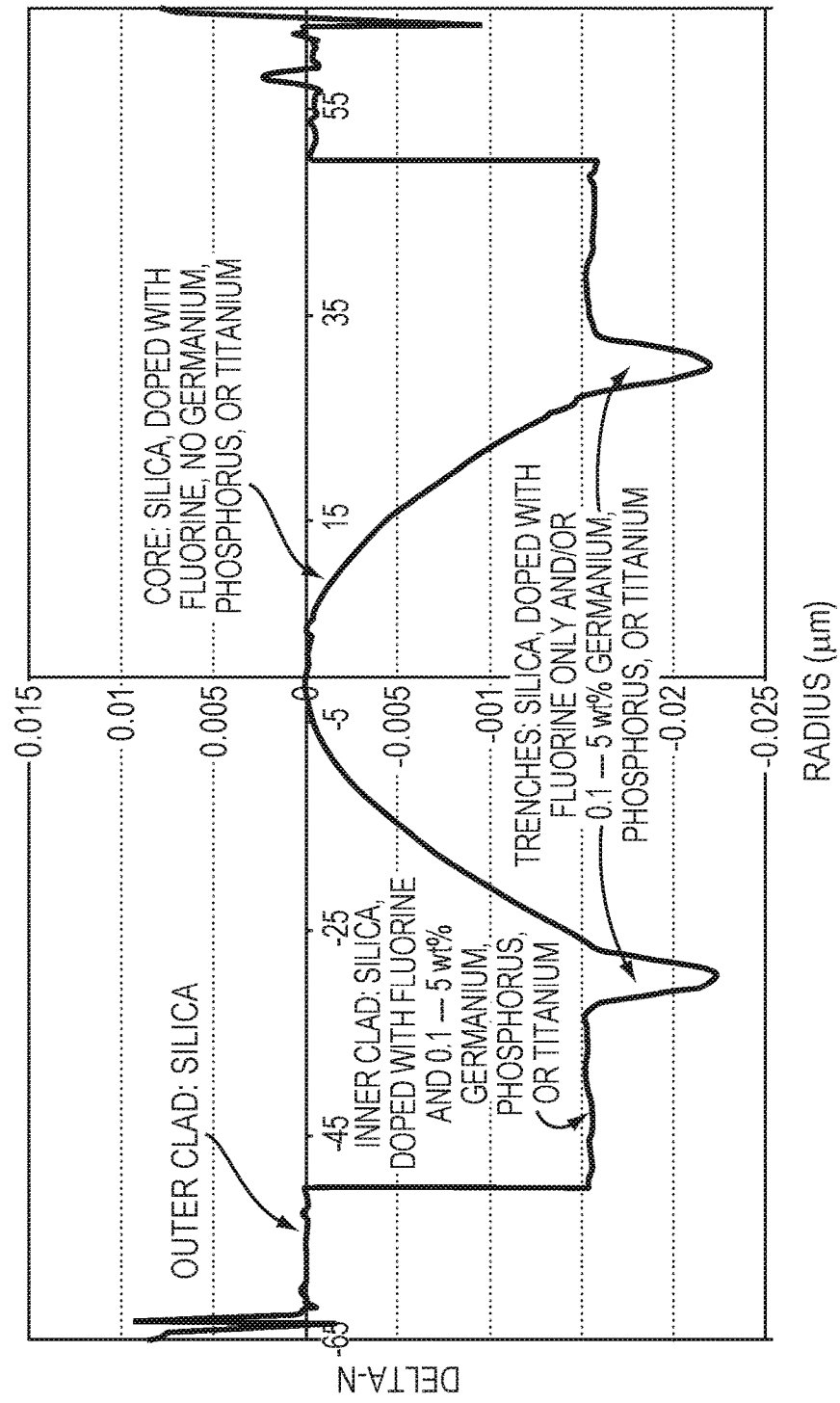
FIG. 6 is a graph of the refractive index profile across different regions of a graded-index optical fiber, including a trench in an inner cladding region and an outer cladding region consisting essentially of silica, in accordance with one embodiment of the invention.

The trench 140 may be an area of exclusively silica and fluorine in the inner cladding region 120, or the trench 140 may also have a small amount (e.g., about 0.1 wt % to about 5.0 wt %) of germanium, phosphorus, and/or titanium. The trench area 140 may define a step in the refractive index profile, the step having a substantially constant refractive index (e.g., through maintaining the concentrations of fluorine, along with germanium, phosphorus, and/or titanium, at a substantially constant level, or by balancing fluctuations in concentrations of the materials to achieve a constant refractive index). In some embodiments, the trench area 140, either by design or through diffusion of fluorine and/or other elements, may have a parabolic refractive index profile, as depicted in FIG. 6. While FIG. 6 depicts a single trench 140 adjacent the core 110, it is possible to dope other areas to create additional trenches 140 away from the core 110 (e.g., as depicted in FIG. 5). Further, the trenches 140 can be any of a variety of widths, including about 2% to about 33% of the radius $r_a$ of the core 110, although narrower and wider trenches 140 are possible. Each of the trenches 140 may be substantially similar in composition and shape, or the trenches 140 may vary in many aspects.

The trenches 140 can provide improved characteristics to the optical fiber 100, such as improved bend loss performance over typical fibers. For example, light that would normally be lost during bending in a typical configuration, is instead trapped and continues to travel down the fiber. By decreasing the bending losses in this manner, fibers using this configuration can be used in applications that may have previously been considered unsuitable due to tight bend radii, or can improve the performance of fibers in pre-existing applications, such as cabling. Typically, when fiber is put into a cable, more fiber is put into the cable than is needed (known as "excess fiber length"). As a result, fiber can be bent continuously throughout the cable, causing increased attenuation at all wavelengths. The addition of the trenches described herein can improve the transmission capability of the fiber, thereby improving performance and allowing for longer cable lengths.

Figure 7:
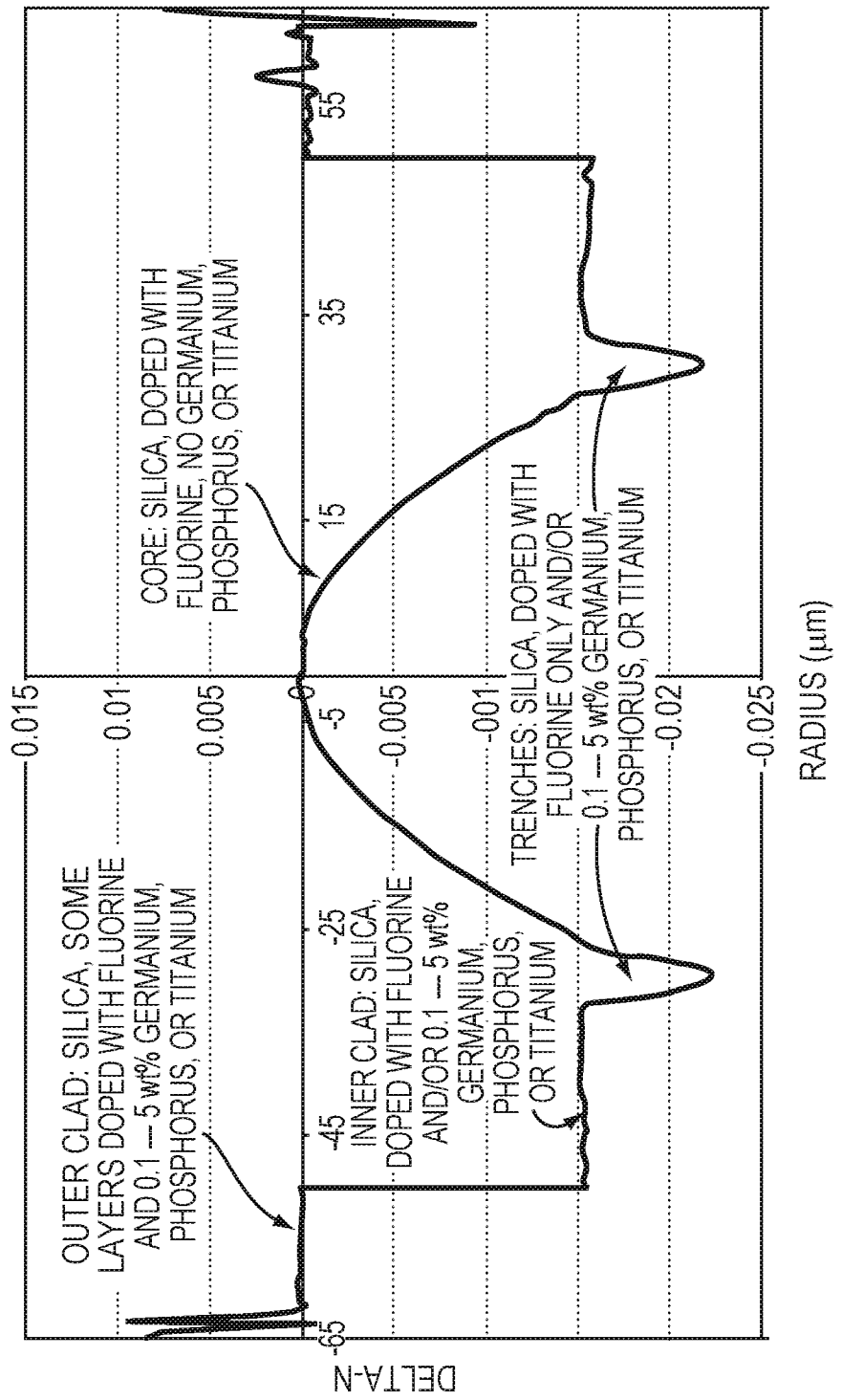
FIG. 7 is a graph of the refractive index profile across different regions of a graded-index optical fiber, including a trench in an inner cladding region and an outer cladding region consisting essentially of silica or silica and fluorine, and doped with at least one of germanium, phosphorus, or titanium.

A step-index optical fiber may have a refractive index similar to that of the graded-index optical fibers illustrated in FIGS. 4, 6, and 7, with the difference that the core of a step-index fiber has a uniform, rather than a graded composition. For example, the core of a step-index optical fiber may include or consist essentially of silica or silica with a uniform distribution of fluorine, resulting in a refractive index profile of the core defining a step rather than a parabolic curve typical of a graded-index optical fiber.

Standard techniques for producing optical fibers that are known in the art may be used to create the various layers described herein. This includes the use of chemical vapor deposition (CVD), modified chemical vapor deposition (MCVD), outside vapor deposition (OVD), plasma chemical vapor deposition (PCVD), and vapor axial deposition (VAD). These methods may be used alone or in conjunction with each other, and can also be used with other known manufacturing methods.

EXAMPLES

Example 1

A depressed graded-index multimode preform was produced using an improved CVD process. As discussed above, suitable processes include CVD, MCVD, OVD, PCVD, and VAD. During this production step, chemicals are deposited on the inner surface of a glass substrate, forming layers of glass. The glass substrate was a commercially available Heraeus F300 tube. When all the layers necessary were deposited, the tube was collapsed to form a solid rod. The number of layers deposited depends on the process being used to produce the preform. Also, the appropriate thicknesses of the deposited layers depend on the process used to produce the preform and the desired final thickness, and are ascertainable by one of skill in the art.

An optical fiber was drawn from this preform using a standard draw process familiar to those skilled in the art. The refractive index profile for this fiber is similar to that shown in FIG. 6.

The optical fiber had the following dimensions and properties:
Fiber Diameter: 125 μm
Inner Cladding Diameter: 77 μm
Core Diameter: 50 μm
Trench Width: 3.5 μm
Trench Center Diameter: 57 μm
Outer Clad Composition: Silica, no dopants
Inner Clad Composition: Flat region: Silica, 0.5 wt % fluorine, 0.6 wt % germanium.
Trenched region: Silica, 0.7 wt % fluorine
Core Composition: Silica and approximately 0.4 wt % to 0 wt % fluorine, with the concentration of fluorine increasing as a radial distance from the central axis increases.
NA: 0.2

Example 2

The process described with respect to Example 1 was used to produce another exemplary fiber. The refractive index profile for this fiber is similar to that shown in FIG. 7, which depicts the profile of a fiber having an outer cladding region formed from silica with some layers doped with fluorine and 0.1 wt %-5 wt % of at least one of germanium, phosphorus, or titanium.

The optical fiber had the following dimensions and properties:
Fiber Diameter: 125 μm
Inner Cladding Diameter: 95 μm
Core Diameter: 50 μm
Trench Width: 3.5 μm
Trench Center Diameter: 57 μm
Outer Clad Composition: Silica with no dopants, except the inner part of the outer clad (2.5 μm) was doped with 2.9 wt % germanium and 0.2 wt % fluorine
Inner Clad Composition: Flat region: Silica, 0.4 wt % fluorine. Trenched region: Silica, 0.7 wt % fluorine
Core Composition: Silica and approximately 0.4 wt %-0 wt % fluorine, with the concentration of fluorine increasing as a radial distance from the central axis increases
NA: 0.2

Example 3

The following example is a hypothetical optical fiber illustrating another embodiment of the invention.

The refractive index profile for this fiber may be similar to that shown in FIG. 7.

The optical fiber may have the following dimensions and properties:
Fiber Diameter: 125 μm
Inner Cladding Diameter: 95 μm
Core Diameter: 50 μm
Trench Width: 3.5 μm
Trench Center Diameter: 57 μm
Outer Clad Composition: Silica, no dopants, except the inner part of the outer clad (2.5 μm) may be doped with 2.9 wt % germanium and 0.2 wt % fluorine
Inner Clad Composition: Flat region: Silica, 0.5 wt % fluorine, 0.6 wt % germanium,.
Trenched region: Silica, 0.7 wt % fluorine
Core Composition: Silica and 0.4 wt %-0 wt % fluorine, with the concentration of fluorine increasing as a radial distance from the central axis increases
NA: 0.2

Example 4

The following example is a hypothetical optical fiber illustrating another possible embodiment of the invention.

The refractive index profile for this fiber may be similar to that shown in FIG. 6.

The optical fiber may have the following dimensions and properties:
Fiber Diameter: 125 μm
Inner Cladding Diameter: 100 μm
Core Diameter: 50 μm
Trench Width: 3.5 μm
Trench Center Diameter: 57 μm
Outer Clad Composition: Silica, no dopants
Inner Clad Composition: Flat region: Silica, 0.4 wt % fluorine. Trenched region: Silica, 0.7 wt % fluorine
Core Composition: Silica, 0.4 wt %-0 wt % fluorine, with the concentration of fluorine increasing as a radial distance from the central axis increases
NA: 0.2

Example 5

The following example is a hypothetical optical fiber illustrating another possible embodiment of the invention.

The refractive index profile for this fiber is a step-index, with the core not being graded by the use of dopants.

The optical fiber may have the following dimensions and properties:
Fiber Diameter: 125 μm
Inner Cladding Diameter: 100 μm
Core Diameter: 50 μm Trench Width: 3.5 µm
Trench Center Diameter: 57 µm
Outer Clad Composition: Silica, no dopants, except the inner part of the outer clad (2.5 µm) may be doped with 2.9 wt % germanium and 0.2 wt % fluorine
Inner Clad Composition: Flat region: Silica, 0.4 wt % fluorine. Trenched region: Silica, 0.7 wt % fluorine
Core Composition: Silica, no dopants
NA: 0.2

Example 6

The following example is a hypothetical optical fiber illustrating another possible embodiment of the invention.
The refractive index profile for this fiber may be similar to that shown in FIG. 6.
The optical fiber may have the following dimensions and properties:
Fiber Diameter: 125 µm
Inner Cladding Diameter: 100 µm
Core Diameter: 50 µm
Trench Width: 3.5 µm
Trench Center Diameter: 57 µm
Outer Clad Composition: Silica, no dopants
Inner Clad Composition: Flat region: Silica, 0.7 wt % fluorine-0.5 wt % fluorine, with the concentration of fluorine increasing as a radial distance from the central axis decreases. 0.8 wt % germanium-0.6 wt % germanium, with the concentration of germanium increasing as a radial distance from the central axis decreases. Trenched region: Silica, 0.7 wt % fluorine
Core Composition: Silica, 0.4 wt %-0 wt % fluorine, with the concentration of fluorine increasing as a radial distance from the central axis increases
NA: 0.2

Having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A hydrogen-resistant, graded-index optical fiber comprising:
a core having a central axis, the core consisting essentially of silica and fluorine, wherein a concentration of fluorine within the core increases as a radial distance from the central axis increases; and
a cladding region surrounding the core, the cladding region comprising an inner cladding region (i) comprising silica, fluorine, and at least one of germanium, phosphorus, and titanium, and (ii) having a refractive index lower than a refractive index of the core,
wherein a concentration of fluorine and at least one of germanium, phosphorus, and titanium in the inner cladding region varies substantially across the inner cladding region.

2. The hydrogen-resistant, graded-index optical fiber of claim 1, wherein the inner cladding region comprises about 0.1 wt % to about 5.0 wt % of at least one of germanium, phosphorus, and titanium.

3. The hydrogen-resistant, graded-index optical fiber of claim 1, wherein the inner cladding region comprises at least one trench characterized by a lower refractive index than adjacent areas.

4. The hydrogen-resistant, graded-index optical fiber of claim 3, wherein each trench has at least one of a width of about 2% to about 33% of a radius of the core, a decrease in refractive index relative to other areas of the inner cladding region of about $-5 \times 10^{-3}$ to about $-1 \times 10^{-3}$, and a location adjacent the core.

5. The hydrogen-resistant, graded-index optical fiber of claim 4, wherein each trench consists essentially of silica and fluorine.

6. The hydrogen-resistant, graded-index, optical fiber of claim 4, wherein each trench consists essentially of silica, fluorine, and about 0.1 wt % to about 5.0 wt % of at least one of germanium, phosphorus, and titanium.

7. The hydrogen-resistant, graded-index optical fiber of claim 4, wherein a concentration of fluorine and at least one of germanium, phosphorus, and titanium in each trench varies substantially across the respective trench.

8. The hydrogen-resistant, graded-index optical fiber of claim 4, wherein the concentration of fluorine and at least one of germanium, phosphorus, and titanium in each trench is substantially constant across the respective trench.

9. A hydrogen-resistant, graded-index optical fiber comprising:
a core having a central axis, the core consisting essentially of silica and fluorine, wherein a concentration of fluorine within the core increases as a radial distance from the central axis increases; and
a cladding region surrounding the core, the cladding region comprising an inner cladding region (i) comprising silica, fluorine, and at least one of germanium, phosphorus, and titanium, and (ii) having a refractive index lower than a refractive index of the core,
wherein a concentration of fluorine and at least one of germanium, phosphorus, and titanium in the inner cladding region is substantially constant across the inner cladding region.

10. The hydrogen-resistant, graded-index optical fiber of claim 9, wherein the inner cladding region comprises about 0.1 wt % to about 5.0 wt % of at least one of germanium, phosphorus, and titanium.

11. The hydrogen-resistant, graded-index optical fiber of claim 9, wherein the inner cladding region comprises at least one trench characterized by a lower refractive index than adjacent areas.

12. The hydrogen-resistant, graded-index optical fiber of claim 11, wherein each trench has at least one of a width of about 2% to about 33% of a radius of the core, a decrease in refractive index relative to other areas of the inner cladding region of about $-5 \times 10^{-3}$ to about $-1 \times 10^{-3}$, and a location adjacent the core.

13. The hydrogen-resistant, graded-index optical fiber of claim 12, wherein each trench consists essentially of silica and fluorine.

14. The hydrogen-resistant, graded-index, optical fiber of claim 12, wherein each trench consists essentially of silica, fluorine, and about 0.1 wt % to about 5.0 wt % of at least one of germanium, phosphorus, and titanium.

15. The hydrogen-resistant, graded-index optical fiber of claim 12, wherein a concentration of fluorine and at least one of germanium, phosphorus, and titanium in each trench varies substantially across the respective trench.

16. The hydrogen-resistant, graded-index optical fiber of claim 12, wherein the concentration of fluorine and at least one of germanium, phosphorus, and titanium in each trench is substantially constant across the respective trench.

17. A hydrogen-resistant, graded-index optical fiber comprising:

a core having a central axis, the core consisting essentially of silica and fluorine, wherein a concentration of fluorine within the core increases as a radial distance from the central axis increases; and a cladding region surrounding the core, the cladding region comprising an outer cladding region comprising silica, fluorine, and at least one of germanium, phosphorus, and titanium.

18. The hydrogen-resistant, graded-index optical fiber of claim 17, wherein a concentration of fluorine and at least one of germanium, phosphorus, and titanium in the outer cladding region varies substantially across the outer cladding region.

19. The hydrogen-resistant, graded-index optical fiber of claim 17, wherein a concentration of fluorine and at least one of germanium, phosphorus, and titanium in the outer cladding region is substantially constant across the outer cladding region.

20. The hydrogen-resistant, graded-index optical fiber of claim 17, wherein the outer cladding region comprises about 0.1 wt % to about 5.0 wt % of at least one of germanium, phosphorus, and titanium.

21. The hydrogen-resistant, graded-index optical fiber of claim 17, wherein the cladding further comprises an inner cladding region disposed between the core and the outer cladding region, the inner cladding region (i) comprising silica, fluorine, and at least one of germanium, phosphorus, and titanium, and (ii) the inner cladding region having a refractive index lower than a refractive index of the core.

22. The hydrogen-resistant, graded-index optical fiber of claim 17, wherein the cladding region further comprises an inner cladding region disposed between the core and the outer cladding region, and the inner cladding region consists essentially of silica and fluorine.

* * * * *